United States Patent
Sytz

(10) Patent No.: US 10,422,055 B2
(45) Date of Patent: Sep. 24, 2019

(54) COMPOSITE YARN OF LIQUID CRYSTAL POLYMER FIBERS AND MODIFIED POLYACRYLONITRILE FIBERS

(71) Applicant: SHADOW WORKS, LLC, Lorton, VA (US)

(72) Inventor: Ronald Sytz, Gastonia, NC (US)

(73) Assignee: SHADOW WORKS, LLC, Lorton, VA (US)

( * ) Notice: Subject to any disclaimer, the term of this patent is extended or adjusted under 35 U.S.C. 154(b) by 218 days.

(21) Appl. No.: 15/803,134

(22) Filed: Nov. 3, 2017

(65) Prior Publication Data

US 2018/0057968 A1   Mar. 1, 2018

Related U.S. Application Data

(60) Provisional application No. 62/403,986, filed on Oct. 4, 2016.

(51) Int. Cl.
| | |
|---|---|
| *D02G 3/04* | (2006.01) |
| *C08L 67/04* | (2006.01) |
| *F41H 1/02* | (2006.01) |
| *F41H 5/04* | (2006.01) |

(52) U.S. Cl.
CPC .............. *D02G 3/045* (2013.01); *C08L 67/04* (2013.01); *F41H 1/02* (2013.01); *F41H 5/0485* (2013.01); *C08L 2203/12* (2013.01)

(58) Field of Classification Search
CPC ............ D02G 3/045; D02G 3/02; D02G 3/04; D02G 3/047; D02G 3/18; D02G 3/182; D02G 3/187; C08L 67/00; C08L 67/04; C08L 2203/00; C08L 2203/12; F41H 1/00; F41H 1/02; F41H 1/04; F41H 5/00; F41H 5/04; F41H 5/0485; F41H 5/0478
See application file for complete search history.

(56) References Cited

U.S. PATENT DOCUMENTS

| | | | |
|---|---|---|---|
| 5,480,706 A * | 1/1996 | Li | B29C 70/08 428/113 |
| 5,771,488 A * | 6/1998 | Honkala | A41D 31/24 2/2.5 |
| 6,268,301 B1 * | 7/2001 | Dalman | C08G 75/32 442/217 |
| 6,276,255 B1 * | 8/2001 | Field | F41H 5/0485 2/2.5 |
| 2004/0132368 A1 * | 7/2004 | Price | B32B 5/26 442/247 |

(Continued)

*Primary Examiner* — Ismael Izaguirre
(74) *Attorney, Agent, or Firm* — Juneau & Mitchell; Todd L. Juneau

(57) ABSTRACT

The invention relates to a multifunctional protective textile for protective garments and accessories made from high strength fibers, said garments and accessories are abrasion resistant, improved penetration resistant, laceration resistant, and flame resistant, the textile is made from a flame resistant knitted outer layer made of a first yarn containing modacrylic, FR rayon, Opan, or aramid fibers; and, a penetration resistant knitted inner layer made of a second yarn made from 50-90% HBA/HNA filaments, as well as methods of manufacturing yarn, methods of manufacturing a textile using the yarn, and apparel made from the yarn.

21 Claims, 12 Drawing Sheets

A Multilayer Knitted Textile
abrasion resistant,
penetration resistant,
laceration resistant, and
flame resistant (i) OUTER LAYER
flame resistant
knitted
made of a first yarn
containing modacrylic, FR rayon, Opan, or aramid fibers; and (ii) INNER LAYER
penetration resistant
knitted
made of a second yarn
made from 50-90%
HBA/HNA filaments.

Multilayer Knitted Textile

Flame Resistant Outer Layer Knitted into a First Layer attached to

Penetration Resistant Inner Layer Knitted as a Second Layer.

(56) References Cited

U.S. PATENT DOCUMENTS

| | | | |
|---|---|---|---|
| 2011/0233462 A1* | 9/2011 | Bu | C08G 63/605 |
| | | | 252/299.5 |
| 2013/0042385 A1* | 2/2013 | Hines | D02G 3/047 |
| | | | 2/85 |
| 2014/0283290 A1* | 9/2014 | Mizobuchi | D02G 3/443 |
| | | | 2/458 |
| 2015/0291332 A1* | 10/2015 | Misciagna | B60K 15/03177 |
| | | | 220/560.03 |

* cited by examiner

FIGURE 1

A Multilayer Knitted Textile
abrasion resistant,
penetration resistant,
laceration resistant, and
flame resistant (i) OUTER LAYER
flame resistant
knitted
made of a first yarn
containing modacrylic, FR rayon, Opan, or aramid fibers; and (ii) INNER LAYER
penetration resistant
knitted
made of a second yarn
made from 50-90%
HBA/HNA filaments.

FIGURE 2

Multilayer Knitted Textile

Flame Resistant Outer Layer Knitted into a First Layer attached to

Penetration Resistant Inner Layer Knitted as a Second Layer.

FIGURE 3

Multilayer Knitted Textile

Flame Resistant Outer Layer is

Interlock Knitted with

Penetration Resistant Inner Layer.

FIGURE 4

Multilayer Knitted Textile

Flame Resistant Outer Layer is plaited with

Penetration Resistant Inner Layer.

FIGURE 5

ARTICLES MADE FROM
Multilayer Knitted Textile

| | |
|---|---|
| apparel | pouches |
| bags | pockets |
| dry bags | harnesses |
| inflatable boats | web-gear |
| air bags | hats |
| footwear | helmets |
| insoles for boots | headgear |
| booties | shoes |
| flip flops | skate shoes |
| gloves | insoles |
| dive gear | socks |
| wetsuits | cuffs |
| drysuits | armbands |
| uniforms | tents |
| vests | armor |
| flight suits | carriers |
| pullovers | belts |
| rash guards | covers |
| jackets | furnishings |
| coveralls | drapery |
| shirts | outdoor fabric |
| trousers | rope |
| gear bags | |

FIGURE 6

PROCESS STEPS
for manufacturing a Multilayer Knitted Textile:

(i) providing a first yarn
containing modacrylic or aramid fibers;

(ii) knitting the first yarn
into a fabric outer layer;

(iii) providing a second yarn
made from 50-90% HBA/HNA filaments;

(iv) knitting the second yarn
into a fabric inner layer; and (v) assembling the fabric outer layer
and the fabric inner layer
into a multilayer knitted textile.

*Image 1: Ring Spun Yarn*

*Image 2: Double Knit Interlock Construction*

FIGURE 9

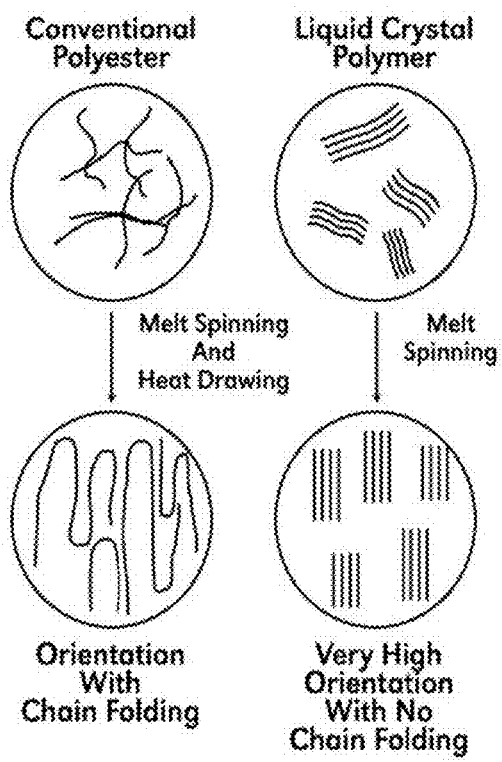

FIGURE 10

| Materials | Density (g/cm³) | Tensile strength (GPa) | Specific strength (km$^a$) | Tensile modulus (GPa) | Specific modulus (km$^b$) |
|---|---|---|---|---|---|
| HBA/HNA | 1.4 | 3.2 | 229 | 75 | 5300 |
| Titanium | 4.5 | 1.3 | 29 | 110 | 2500 |
| Steel | 7.9 | 2.0 | 26 | 210 | 2700 |
| Aluminum | 2.8 | 0.6 | 22 | 70 | 2600 |
| E-glass | 2.6 | 3.4 | 130 | 72 | 2800 |

$^a$Specific strength = strength/density (also divided by force of gravity for SI units). Also known as breaking length, the length of fiber that could be held in a vertical direction without breaking
$^b$Specific modulus = modulus/density (also divided by force of gravity for SI units). This measure increases with increasing stiffness and decreasing density

FIGURE 11

| Materials | Density (g/cm³) | Tensile strength (GPa) | Tensile modulus (GPa) | Elongation at break (%) | Moisture regain (%) |
|---|---|---|---|---|---|
| HBA/HNA | 1.40 | 3.4 | 70 | 4 | <0.1 |
| PET | 1.38 | 1.1 | 14 | 15 | <0.5 |
| Nylon | 1.14 | 1.0 | 10 | 20 | 6–8 |
| Aramid | 1.44 | 3.0 | 65 | 4 | 4–6 |
| UHMW-PE | 0.95 | 3.4 | 110 | 4 | <0.1 |

| Materials | Denier | Relative mod |
|---|---|---|
| HBA/HNA | 1500 | 3.4 |
| Aramid | 1500 | 1.1 |
| UHMW-PE | 1500 | 1.0 |

| | HBA/HNA | Aramid |
|---|---|---|
| LOI | 28 | 30 |
| Melting temperature, °C | 320 | None |
| Heat shrinkage at 180 °C for 30 min, % | <0.2 | <0.2 |
| 50% strength retention temp., °C | 145 | 400 |
| TGA (20% weight loss), °C | >450 | >450 |

FIGURE 14

| Flex cycles-to-failure for 400 denier samples and 1.36 kg Load | | |
|---|---|---|
| | M Cycles-to-Failure | |
| | Average | Range |
| HBA/HNA | 18.1 | 16.5-19.8 |
| Aramid A | 1.3 | 0.7-1.6 |
| Aramid B | 2.2 | 1.3-3.6 |

FIGURE 15

| HBA/HNA HS Tenacity vs. Twists per Inch (TPI) | | |
|---|---|---|
| TPI | 400 denier tenacity gpd | 1500 denier tenacity gpd |
| 0 | 25.6 | 25.6 |
| 0.5 | 26.5 | 26.7 |
| 1.0 | 27.8 | 27.6 |
| 1.5 | 27.8 | 28.6 |
| 2.0 | 28.6 | 27.9 |
| 2.5 | 28.8 | 27.6 |
| 3.0 | 28.1 | 25.8 |
| 3.5 | 28.3 | 24.0 |
| 4.0 | 28.3 | 21.8 |
| 4.5 | 27.8 | N/A |
| 5.0 | 27.8 | N/A |

FIGURE 18

Manufacturing a yarn for a textile,:

(STEP 1) preparing a first liquid crystal polymer filament (1st LCP)
wherein the 1st LCP comprises melt spun fibers
of a polycondensate of (HBA) and (HNA) monomers,
wherein the 1st LCP comprises a denier selected from
200d, 400d, 750d, 1000d, 1420d, 1500d, and 2250d;

(STEP 2) preparing a ring spun yarn (RS Yarn),
wherein the RS yarn is made from
a second liquid crystal polymer filament (2d LCP) and
a spun modified polyacrylonitrile (M-PAN),
wherein the 2d LCP comprises melt spun fibers of
a polycondensate of (HBA) and (HNA) monomers,
wherein the 2d LCP comprises a denier selected
200d, 400d, 750d, 1000d, 1420d, 1500d, and 2250d;

(STEP 3) forming a sheath-core structure by
core-spinning a combination of the 1st LCP and the RS Yarn,
wherein the core is selected from the RS Yarn and the 1st LCP, and
wherein the sheath is selected the RS Yarn and the 1st LCP, and
wherein the core and the sheath are different; and (STEP 4) spinning a composite yarn from the core-spun combination of the 1st LCP and
the RS Yarn.

*********

(STEP 5) preparing a textile from the composite yarn above.

COMPOSITE YARN OF LIQUID CRYSTAL POLYMER FIBERS AND MODIFIED POLYACRYLONITRILE FIBERS

BACKGROUND

The invention relates to a multifunctional protective textile for protective garments and accessories made from high strength fibers, said garments and accessories are abrasion resistant, improved penetration resistant, laceration resistant, and flame resistant, the textile is made from a flame resistant knitted outer layer made of a first yarn containing modacrylic or aramid fibers; and, a penetration resistant knitted inner layer made of a second yarn made from 50-90% HBA/HNA filaments, as well as methods of manufacturing yarn, methods of manufacturing a textile using the yarn, and apparel made from the yarn.

Woven, knitted and nonwoven fabrics are useful in a wide variety of hazardous industrial, medical, military, law enforcement, construction, sports, and home environments where the fabrics may be subjected to sharp objects which can abrade, cut or penetrate the fabric.

For example, U.S. Pat. No. 6,276,255 is a soft body-armor invention touted as being comparatively lightweight, in that a vest made of multilayered sheets or woven fiber antiballistic cloth comprised of ultra high molecular weight polyethylene (UHMWPE) filaments. As with all antiballistic clothing, the antiballistic characteristics are obtained not only from the strength of the materials used, but from the use of multiple layering, both increasing weight and decreasing ease of use.

In another example, U.S. Pat. No. 7,010,811 specifically discloses a soft body-armor product described as lightweight, and claims a material comprising an assembly of woven fabric plies sporting a collective mass per square foot of no more than 1 pound. With such material, a vest for a standard-sized adult would weigh nearly 9 pounds.

Despite their antiballistic qualities, known materials in the soft body armor field have a number of drawbacks. For example, materials such a Kevlar and Dyneema have a tendency to be both substantially heavier and rougher to the touch than synthetic and natural-fiber clothing without antiballistic capability. Antiballistic fabrics also tend not to breath, and can cause discomfort and even incapacitate a wearer in environments with high heat and humidity. Equally importantly, the qualities that allow antiballistic fabrics to spread and deflect the energy of a ballistic projectile do not provide sufficient protection against nonballistic forces able to damage the wearer with a puncture or cut, such as nails or knives.

In addition to antiballistic fabrics, there is a need for protective apparel such as gloves that include abrasion-resistant, cut-resistant, thermal resistant, and/or fire-resistant yarn. However, many prior attempts have generated unsatisfactory products, such as being irritating to the skin, being too heavy or inflexible for most applications, having a limited wear life, addressing only one resistance aspect, requiring the use of metal wire or powder fillers, requiring chemical coatings, being difficult to manufacture, or being so uncomfortable to wear or use that it discourages use of the product.

SUMMARY

In order to address the problems in the prior art, the present invention provides herein a preferred embodiment of a multilayer knitted textile, comprising: (i) at least one flame resistant knitted outer layer made of a first yarn containing modacrylic, FR rayon, Opan or aramid fibers; and, (ii) at least one penetration resistant knitted inner layer made of a second yarn made from 50-90% HBA/HNA filaments.

In another preferred embodiment, there is provided a multilayer knitted textile, wherein the at least one flame resistant knitted outer layer is sewn to the at least one penetration resistant knitted layer.

In another preferred embodiment, there is provided a multilayer knitted textile, wherein the at least one flame resistant knitted outer layer is interlock knitted to the at least one penetration resistant knitted layer.

In another preferred embodiment, there is provided a multilayer knitted textile, wherein the at least one flame resistant knitted outer layer is plaited with the at least one penetration resistant knitted layer as an overbraid.

In another preferred embodiment, there is provided an article comprising the multilayer knitted textile described above, wherein the article is selected from the group of products consisting of apparel, bags, dry bags, inflatable boats, air bags, footwear, insoles for boots, booties, flip flops, gloves, dive gear, wetsuits, drysuits, uniforms, vests, flight suits, pullovers, rash guards, jackets, coveralls, shirts, trousers, gear bags, pouches, pockets, harnesses, web-gear, hats, helmets, headgear, shoes, skate shoes, insoles, socks, cuffs, armbands, gloves, tents, armor, carriers, belts, bags, covers, furnishings, drapery, outdoor fabric, and rope.

In another preferred embodiment, there is provided a process for manufacturing a multilayer knitted textile, comprising the steps: (i) providing a first yarn containing modacrylic or aramid fibers; (ii) knitting the first yarn into a fabric outer layer; (iii) providing a second yarn made from 50-90% HBA/HNA filaments; (iv) knitting the second yarn into a fabric inner layer; and (v) assembling where the knitting technique creates the fabric outer layer and the fabric inner layer into a multilayer knitted textile.

In another preferred embodiment, there is provided a composite yarn construction, comprising: a yarn made from (a) liquid crystal polymer filaments and (b) a ring spun yarn, wherein the (b) ring spun yarn is made from (b1) liquid crystal polymer filaments and (b2) spun M-PAN.

In other preferred embodiments, there is provided composite yarn, wherein (a) liquid crystal polymer filaments are melt spun aromatic polyester filaments, and/or wherein the (a) liquid crystal polymer filaments are melt spun fibers of a polycondensate of 4-hydroxybenzoic acid (HBA) and 6-hydroxynaphthalene-2-carboxylic acid (HNA) monomers (HBA/HNA), and/or wherein the (a) liquid crystal polymer filaments are HBA/HNA, and wherein the liquid crystal polymer filaments comprise a denier selected from the group consisting of 200d, 400d, 750d, 1000d, 1420d, 1500d, and 2250d.

In another preferred embodiment, there is provided composite yarn wherein the (b1) liquid crystal polymer filaments of (b) the ring spun yarn are melt spun aromatic polyester filaments, and/or wherein the (b1) liquid crystal polymer filaments of (b) the ring spun yarn are HBA/HNA, and/or wherein the (b1) liquid crystal polymer filaments of (b) the ring spun yarn are HBA/HNA, and wherein the liquid crystal polymer filaments comprise a denier selected from the group consisting of 200d, 400d, 750d, 1000d, 1420d, 1500d, and 2250d.

In another preferred embodiment, there is provided a composite yarn wherein the (b2) spun M-PAN co-polymer has 35-50% acrylonitrile or 50-85% acrylonitrile.

In another preferred embodiment, there is provided a composite yarn wherein the percentage of (a) liquid crystal polymer filaments ranges from 70-99% and (b) a ring spun yarn ranges from 1-30% by weight, and/or wherein the percentage of (a) liquid crystal polymer filaments ranges from 85-95% and (b) a ring spun yarn ranges from 5-15% by weight, and/or wherein the percentage of (a) liquid crystal polymer filaments is 90% and (b) a ring spun yarn is 10% by weight.

In another preferred embodiment, there is provided a composite yarn wherein the percentage in the (b) ring spun yarn of (b1) liquid crystal polymer filaments ranges from 70-99% and (b) M-PAN ranges from 1-30% by weight, and/or wherein the percentage in the (b) ring spun yarn of (b1) liquid crystal polymer filaments ranges from 85-95% and (b) M-PAN ranges from 5-15% by weight, and/or wherein the percentage in the (b) ring spun yarn of (b1) liquid crystal polymer filaments 90% and (b) M-PAN is 10% by weight.

In another preferred embodiment, there is provided a composite yarn, comprising: a yarn made from (a) 90% HBA/HNA filaments and (b) a ring spun yarn, wherein the (b) ring spun yarn is made from (b1) 90% HBA/HNA filaments 400d and (b2) 10% spun M-PAN.

In another preferred embodiment, there is provided a composite yarn wherein the (a) HBA/HNA filaments form a sheath around the (b) ring spun yarn core.

In another preferred embodiment, there is provided a textile for making apparel, the textile comprising the composite yarn disclosed and claimed herein.

In another preferred embodiment, there is provided wherein the apparel is selected from the group consisting of a wetsuit, drysuit, uniform, vest, flight suit, pullover, rash guard, jacket, coverall, gear bag, pouch, pocket, harness, webgear, hat, helmet, headgear, shoe, boot, shoe liner, boot liner, skate shoe, insole, sock, cuff, armband, glove, tent, armor, carrier, belt, bag, cover, and rope.

In another preferred embodiment, there is provided wherein the textile is made using a double-knit interlock construction.

In another preferred embodiment, there is provided wherein the textile is breathable, non-irritating, and anti-bacterial.

In yet another preferred embodiment, there is provided a method of manufacturing a yarn for a textile, comprising the steps: (i) preparing a first liquid crystal polymer filament that comprises melt spun fibers of a polycondensate of 4-hydroxybenzoic acid (HBA) and 6-hydroxynaphthalene-2-carboxylic acid (HNA) monomers (HBA/HNA), wherein the first liquid crystal polymer filament comprises a denier selected from the group consisting of 200d, 400d, 750d, 1000d, 1420d, 1500d, and 2250d; (ii) preparing a ring spun yarn, wherein the ring spun yarn is made from a second liquid crystal polymer filament and a spun modified polyacrylonitrile (M-PAN), wherein the second liquid crystal polymer filament comprises melt spun fibers of a polycondensate of 4-hydroxybenzoic acid (HBA) and 6-hydroxynaphthalene-2-carboxylic acid (HNA) monomers (HBA/HNA), wherein the second liquid crystal polymer filament comprises a denier selected from the group consisting of 200d, 400d, 750d, 1000d, 1420d, 1500d, and 2250d; (iii) forming a sheath-core structure by core-spinning a combination of the first liquid crystal polymer filament and the ring spun yarn, wherein the core is selected from the group consisting of the ring spun yarn and the first liquid crystal polymer filament, and wherein the sheath is selected from the group consisting of the ring spun yarn and the first liquid crystal polymer filament, and wherein the core and the sheath are different; and (iv) spinning a composite yarn from the core-spun combination of the first liquid crystal polymer filament and the ring spun yarn.

In another preferred embodiment, there is provided wherein the method further comprises the step of preparing a textile from the composite yarn.

BRIEF DESCRIPTION OF THE DRAWINGS

FIG. 1 is a text graphic showing one preferred embodiment of the main components of the present invention.

FIG. 2 is a text graphic and shows one option for attaching the first layer to the second layer.

FIG. 3 is a text graphic and shows a second option for attaching the first layer to the second layer.

FIG. 4 is a text graphic and shows a third option for attaching the first layer to the second layer.

FIG. 5 is a text graphic list of the inventive articles that can be made from the textile invention described herein.

FIG. 6 is a text graphic and represents five (5) process steps for manufacturing the multilayer knitted textile of the present invention.

FIG. 9 is a drawing showing the orientation of fibers in a liquid crystal polymer compared to a polyester fiber.

FIG. 10 is a table comparing the strength of HBA/HNA against other materials.

FIG. 11 is a table comparing the strength of HBA/HNA against other polymer fibers.

FIG. 14 is a table showing the number of cycles in a flex test before a fiber fails, and compares HBA/HNA against aramid fibers.

FIG. 15 is a table showing the tenacity of HBA/HNA as it relates to the number of twists per inch in a yarn construction.

FIG. 18 is a flowchart showing certain method steps according to the present invention.

DETAILED DESCRIPTION OF THE INVENTION

Figure 7:
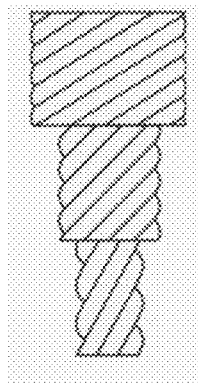
FIG. 7 is a graphic representation of a three-layer ring spun yarn.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Rather, these embodiments are provided so that this disclosure will be thorough and complete, and will fully convey the scope of the invention to those skilled in the art. Like numbers refer to like elements throughout. As used herein the term "and/or" includes any and all combinations of one or more of the associated listed items.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Referring now to FIG. 1, FIG. 1 is a text graphic showing one preferred embodiment of the main components of the present invention, namely a multilayer knitted textile, comprising: (i) at least one flame resistant knitted outer layer made of a first yarn containing modacrylic or aramid fibers; and, (ii) at least one penetration resistant knitted inner layer made of a second yarn made from 50-90% HBA/HNA filaments.

FIG. 2 is a text graphic and shows one option for attaching the first layer to the second layer in a multilayer knitted textile, wherein the at least one flame resistant knitted outer layer uses a knitting technique, or is sewn, to the at least one penetration resistant knitted layer.

FIG. 3 is a text graphic and shows a second option for attaching the first layer to the second layer in a multilayer knitted textile, wherein the at least one flame resistant knitted outer layer is interlock knitted to the at least one penetration resistant knitted layer.

FIG. 4 is a text graphic and shows a third option for attaching the first layer to the second layer. in a multilayer knitted textile, wherein the at least one flame resistant knitted outer layer is plaited with the at least one penetration resistant knitted layer as an overbraid.

FIG. 5 is a text graphic list of the inventive articles that can be made from the textile invention described herein. Specifically, the article may be apparel, bags, dry bags, inflatable boats, air bags, footwear, insoles for boots, booties, flip flops, gloves, dive gear, wetsuits, drysuits, uniforms, vests, flight suits, pullovers, rash guards, jackets, coveralls, shirts, trousers, gear bags, pouches, pockets, harnesses, web-gear, hats, helmets, headgear, shoes, skate shoes, insoles, socks, cuffs, armbands, gloves, tents, armor, carriers, belts, bags, covers, furnishings, drapery, outdoor fabric, and rope.

FIG. 6 is a text graphic and represents five (5) broad process steps for manufacturing the multilayer knitted textile of the present invention. The process for manufacturing a multilayer knitted textile is illustrated in the steps: (i) providing a first yarn containing modacrylic or aramid fibers; (ii) knitting the first yarn into a fabric outer layer; (iii) providing a second yarn made from 50-90% HBA/HNA filaments; (iv) knitting the second yarn into a fabric inner layer; and (v) assembling where the knitting technique creates the fabric outer layer and the fabric inner layer into a multilayer knitted textile Referring now to FIG. 7, there is shown a drawing of a ring-spun yarn. In ring-spun yarns, twisting takes place from the outside inwards. At the periphery (the outer sheath A, owing to the greater degree of winding, the fibers have a lesser inclination, ($\gamma$=angle between the fibers and the axis of the yarn) than in the interior of the yarn (the core B). Since the fibers become steadily less tightly wound towards the core, ring-spun yarn may be said to have sheath-twist. Under loading, the outer layers will tend to take the radial forces and the inner layers will tend to take the axial forces. However, by increasing pressure inwards, the radial forces reinforce axial resistance to sliding apart of the fibers. Accordingly, fully twisted yarns with sheath-twist have high tensile strength but are not so resistant to abrasion.

Denier: is a unit of measure for the linear mass density of fibers. It is defined as the mass in grams per 9000 meters, or more commonly, Weight in milligrams of a 9 meters strand. 1 denier=0.11 mg/m. The denier is based on a natural reference—i.e., a single strand of silk is approximately one denier. A 9000-meter strand of silk weighs about one gram. The term denier comes from the French denier, a coin of small value. Applied to yarn, a denier was held to be equal in weight to $\frac{1}{24}$ of an ounce. The term microdenier is used to describe filaments that weigh less than one gram per 9000 meters.

One can distinguish between filament and total measurements in deniers. Both are defined as above but the first only relates to a single filament of fiber-commonly known as denier per filament (DPF)—whereas the second relates to a yarn, a spun agglomeration of filaments.

Broader terms such as 'fine' may be applied because either the overall yarn is fine or because fibers within this yarn are thin. 75 denier yarn would be considered fine even if it only contains a few fibers, such as thirty 2-denier fibers, but a heavier yarn such as 150 denier is only considered fine if its constituent fibers are individually as thin as 1 denier.

The following relationship applies to straight, uniform filaments:

DPF=total denier/quantity of uniform filaments

The denier system of measurement is used on two- and single-filament fibers. Some common calculations are as follows:

1 denier=1 gram per 9 000 meters=0.111 milligrams per meter

In practice, measuring 9000 meters is both time-consuming and unrealistic; generally a sample of 900 meters is weighed and the result multiplied by 10 to obtain the denier weight.

A fiber is generally considered a microfiber if it is one denier or less.

A one-denier polyester fiber has a diameter of about ten micrometers.

One can calculate the diameter of a filament yarn using denier with the following formula (where density is in grams per cubic centimeter and the diameter is in mm):

$$\text{Diameter} = \sqrt{\frac{\text{Denier}}{9000 \cdot \text{density} \cdot 0.7855}}$$

Fiber Strength (Tenacity):

Another linear mass density unit is called tex. The Tensile Strength expressed as force per unit liner density is called tenacity. (units of cN/tex). This is normally expressed as gram force per tex (gf/tex)–dtex (deci)=grams/10,000 m. Note: The higher the value, the better the strength of the yarn. Units g.dTex refers to grams per deci-tex (0.1 of tex)(tex=1 mg/m, weight to length ratio).

Yarn

The invention begins with a novel yarn construction, providing high-level durability and trauma resistance, while still feeling and behaving as standard apparel fabric when woven appropriately. The term yarn generally refers without limitation to a long continuous length of interlocked fibers suitable for use in the production of textiles, sewing, knitting, weaving, rope making, and the like.

Composites

A composite is a solid material, made out of two or more constituent, different and distinct substances that retain their physical characteristics, while contributing desirable properties to the whole. Composite materials generally include three functions. A matrix function feature that surrounds, supports and maintains position of a reinforcement. A reinforcement function feature that provides one or more special physical characteristics, e.g. mechanical or electrical. And a core function feature used in-between the layers of fiber reinforced matrix forming a type of sandwich structure. When matrix and reinforcement are combined in a laminate to form a new material, this can result in a synergistic characteristic or feature.

Some of the benefits of composite materials include higher mechanical properties like strength and stiffness, lighter weight, higher performance, energy savings, durability, fatigue resistance and longer service life, impact resistance, dimensional stability, anisotropic properties, chemical properties, corrosion resistance, fire retardance, high temperature service, environment outdoor service, low maintenance requirements, low thermal conductivity, low or custom thermal expansion, tailored energy conductivity, (e.g. can be used to amplify or dump vibration), tailored transparency to radio frequency (reflection or dumping properties), tailored electric properties (insulation or conduction capability), tailored electromagnetic transparency, tailored properties for both telecommunication and stealth technologies, flexible, tailor design, part consolidation and freedom of shape, and so forth.

Hybrid Composite Constructions

Included within the scope of the invention are yarn constructions and tow constructions.

Yarn is a twisted bundle of filaments, which may be continuous or non-continuous. Tow is an untwisted bundle of continuous filaments.

Figure 8:
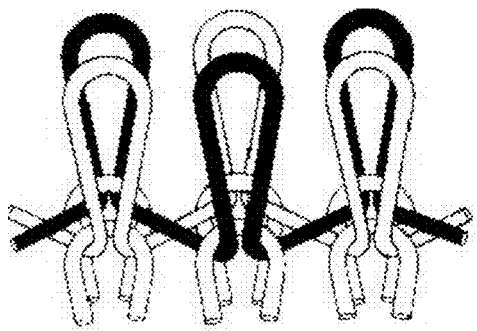
FIG. 8 is a graphic representation of a double knit interlock textile construction.

Referring now to FIG. 8, there is shown an example of a double knit interlock construction. Textile is constructed using a double-knit modified interlock construction. Double knitting is a form in which two fabrics are knitted simultaneously on one pair of needles. The fabrics may be inseparable, as in interlock knitted fabrics.

Referring now to FIG. 9, comparing the orientation of polyester fibers versus the order orientation of HBA/HNA fibers, HBA/HNA is capable of forming regions of highly ordered structure while in the liquid phase. However, the degree of order is somewhat less than that of a regular solid crystal. Typically LCPs have a high mechanical strength at high temperatures, extreme chemical resistance, inherent flame retardancy, and good weatherability. Liquid-crystal polymers come in a variety of forms from sinterable high temperature to injection moldable compounds. LCP can be welded, though the lines created by welding are a weak point in the resulting product. LCP has a high Z-axis coefficient of thermal expansion.

In comparison, conventional polyethylene terephthalate (PET) has flexible molecular chains, and the as-spun fiber from PET has a low molecular orientation giving it a low strength and limiting its industrial use.

In comparison to aramids like Kevlar, Kevlar must be solvent spun due to its lyotrophic nature. In comparison to ultrahigh molecular weight polyethylene (UHMWPE), UHMW-PE must be gel spun in order to control the density of chain entanglements.

LCPs are exceptionally inert. They resist stress cracking in the presence of most chemicals at elevated temperatures, including aromatic or halogenated hydrocarbons, strong acids, bases, ketones, and other aggressive industrial substances. Hydrolytic stability in boiling water is excellent. Environments that deteriorate the polymers are high-temperature steam, concentrated sulfuric acid, and boiling caustic materials.

Melt Spun HBA/HNA, aka ms-HBA/HNA or MS-HBA/HNA, is a multifilament yarn spun from liquid crystal polymer (LCP). HBA/HNA is the only melt spun yarn commercially available. HBA/HNA is an aromatic polyester spun from LCP in melt extrusion. Chemically, HBA/HNA is produced from polycondensation of 4-hydroxybenzoic acid and 6-hydroxynaphthalene-2-carboxylic acid.

[4-hydroxy-benzoic acid]- and -[6-hydroxy-naphthalene-2-carboxylic acid]

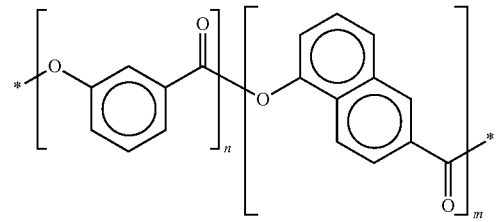

Liquid-crystal polymers (LCPs) are a class of aromatic polyester polymers. They are extremely unreactive and inert, and highly resistant to fire.

HBA/HNA is melt-processed on conventional equipment at high speeds with excellent replication of mold details and the high ease of forming of LCPs is an important competitive advantage against other plastics, as it offsets high raw material cost.

HBA/HNA is a thermotropic liquid crystalline copolymer composed of 4-hydroxybenzoic acid (HBA) and 2-hydroxy-6-naphthoic acid (HNA) monomers in specific molar ratios of HBA/HNA. In one preferred embodiment, the molar ratio ranges from 50-90% HBA to 10-50% HNA. In another preferred embodiment, the molar ratio ranges from 60-85% HBA to 15-40% HNA. In another preferred embodiment, the molar ratio ranges from 65-75% HBA to 25-35% HNA. In another preferred embodiment, the molar ratio equals about 3 moles HBA to 1 mole HNA. In another preferred embodiment, the molar mass ratio equals HBA to HNA in a ratio of about 73 to 27.

Referring now to FIG. 10, comparing HBA/HNA Strength vs. Other Materials, HBA/HNA has the lowest density (g/cm3) with the highest specific strength (km$^a$) and specific modulus (km$^b$).

Referring now to FIG. 11, comparing HBA/HNA Strength vs. Other Fibers, HBA/HNA matches aramid fiber and UHMW-PE fibers for density, tensile strength, low elongation at break, and low moisture regain percentage.

Referring also to FIG. 11, comparing HBA/HNA Cut Resistance, HBA/HNA has nearly three times the score compared to aramid and UHMW-PE fibers at similar deniers.

Referring again to FIG. 11, comparing HBA/HNA Thermal Resistance versus aramid fibers, HBA/HNA shows excellent thermal resistance compared to aramids.

Referring now to FIG. 14, FIG. 14 is a table showing the number of cycles in a flex test before a fiber fails, and compares HBA/HNA against aramid fibers. FIG. 14 shows how HBA/HNA ranges from 9-14 times the number of cycles that aramid does before breaking.

Referring now to FIG. 15, FIG. 15 is a table showing the tenacity of HBA/HNA as it relates to the number of twists per inch in a yarn construction. FIG. 15 shows how the ideal number of twists per inch is around 2.5, but also that tenacity is excellent across a range of TPI.

Figure 16:
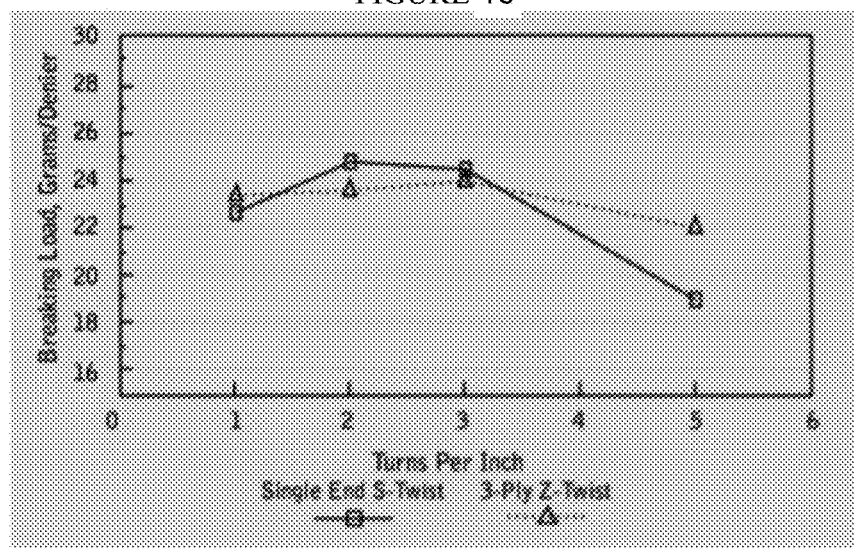
FIG. 16 is a table showing the breaking load of HBA/HNA fibers comparing an S-twist versus a 3-ply Z twist.

Referring now to FIG. 16, FIG. 16 is a table showing the breaking load of HBA/HNA fibers comparing an S-twist versus a 3-ply Z twist. FIG. 10, shows that HBA/HNA can be used successfully in complex or hybrid yarns, and that HBA/HNA increases in strength when the complexity of the twisted composite fiber is increased.

Figure 17:
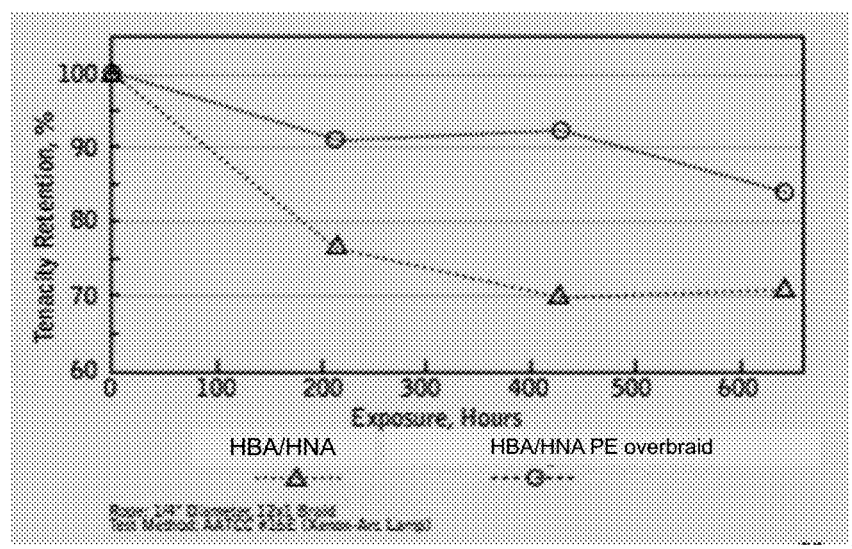
FIG. 17 is a table showing the difference in tenacity under UV stress between a HBA/HNA filament yarn with and without a polyester over-braid/sheath.

Referring now to FIG. 17, FIG. 17 is a table showing the difference in tenacity under UV stress between a HBA/HNA filament yarn with and without a polyester over-braid/sheath. FIG. 17 shows that using a UV sheath or overbraid is an effective way to manage the single weak aspect of HBA/HNA fibers, UV exposure.

Modified polyacrylonitrile (M-PAN) is a co-polymer having from 35% to 85% acrylonitrile that has been modified by halogen containing co-monomers including polyvinyl chloride known as Dynel® and/or with vinylidene chloride known as Verel®.

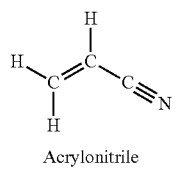

Acrylonitrile

Polyacrylonitrile is a polymer of acrylonitrile monomers.

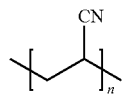

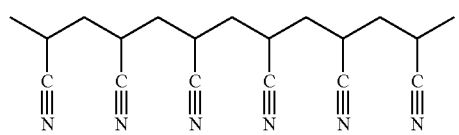 [SMILES: CC(C#N)CC(C#N)CC(C#N)CC(C#N)CC(C#N)CC(C)C#N]

Polyacrylonitrile

M-PAN is a synthetic copolymer. M-PAN polymer fibers, yarns, and fabrics are soft, strong, resilient, and dimensionally stable. They can be easily dyed, show good press and shape retention, and are quick to dry. They have outstanding resistance to chemicals and solvents, are not attacked by moths or mildew, and are nonallergenic. Among their uses are in apparel linings, furlike outerwear, paint-roller covers, scatter rugs, carpets, and work clothing and as hair in wigs.

M-PAN fibers are modified acrylic fibers made from acrylonitriles, but larger amounts of other polymers are added to make the copolymers. The M-PAN fibers are produced by polymerizing the components, dissolving the copolymer in acetone, pumping the solution into the column of warm air (dry-spun), and stretching while hot.

M-PAN fibers are creamy or white and are produced in tow and staple form. If looked at in cross section views they have an irregular shape. M-PAN fibers are also produced in many different lengths, crimp levels, deniers and they can have various shrinkage potentials.

The Federal Trade Commission defines M-PAN fibers as manufactured fibers in which the fiber-forming substance is any long-chain synthetic polymer composed of less than 85%, but at least 35% weight acrylonitrile units except when the polymer qualifies as rubber.

A M-PAN has properties that are similar to an acrylic. However, M-PANs are flame retardant and do not combust. The fibers are difficult to ignite and will self-extinguish. In addition to a M-PAN's flame retardant properties it has a relatively high durability that is comparable to wool. M-PAN fibers have a moderate resistance to abrasion and a very low tenacity. One of the most interesting properties of M-PAN fabrics is the arc flash protection, where it has very good values. M-PANs are poor conductors of heat. The fabrics are soft, warm and resilient but are prone to pilling and matting. M-PANs display high performance when it comes to appearance retention. The fibers are quite resilient and will not wrinkle. They also have great dimensional stability and high elastic recovery, which gives them the ability to hold their shape.

M-PANs are used primarily in applications where environmental resistance or flame retardancy is necessary or required. M-PANs have the ability to combine flame retardancy with a relatively low density, meaning protective gear is not uncomfortably heavy (i.e. shirts and trousers worn by electrical linemen). The combination of flame retardancy and low density is also useful in furnishings, draperies, and outdoor fabrics.

Example 1—Sheathed Ring Spun Yarn

In one preferred embodiment, the invention provides a co-extruded filament hybrid composite sheathed with a second filament. In this example, 400d (denier) HBA/HNA (V1) and M-PAN (M) are melt co-extruded in a 90-10 ratio (V1:M) through fine diameter capillaries resulting in a first component filament (F1), and the first strand (F1) is then ring-spun into a multi-layer ring-spun yarn (RS), the multi-layer ring spun yarn is then sheathed with a HBA/HNA (V2) filament in a 10:90 ratio (RS:V2), to form a sheathed ring spun yarn (SRS).

Example 2—Double Twisted Yarn

In one preferred embodiment, the invention provides a hybrid composite double twisted yarn. In this example, a 400d (denier) HBA/HNA (V1) filament and M-PAN (M) filament are twisted in a 90-10 ratio (V1:M) resulting in a first component twisted filament (TF1), and the first twisted filament (TF1) is then ring-spun into a multi-layer ring-spun yarn (RS), the multi-layer ring spun yarn is then sheathed with a HBA/HNA (V2) filament in a 10:90 ratio (RS:V2), to form a sheathed ring spun yarn (SRS).

Example 3—Filament Core Double Twisted Yarn

In one preferred embodiment, the invention provides a hybrid composite filament core double twisted yarn. In this example, a 400d (denier) HBA/HNA (V1) filament and M-PAN (M) filament are twisted in a 90-10 ratio (V1:M) resulting in a first component twisted filament (TF1), and the first twisted filament (TF1) is then ring-spun into a multi-layer ring-spun yarn (RS), the multi-layer ring spun yarn is then used to sheath a HBA/HNA (V2) core filament, in a 10:90 ratio (RS:V2), to form a filament core ring-spun sheathed yarn (FCRSS).

Example 4—Sheathed Ring-Spun Tow (Non-Yarn)

In one preferred embodiment, the invention provides a sheathed ring-spun tow hybrid composite. In this example, 400d (denier) HBA/HNA filament (V1) and M-PAN (M) are bundled as an untwisted tow in a 90-10 ratio (V1:M) resulting in a first component bundle filament (B 1), and the first component bundle filament (B 1) is then ring-spun into a multi-layer ring-spun yarn (RS), the multi-layer ring spun yarn is then sheathed with a HBA/HNA (V2) filament in a 10:90 ratio (RS:V2), to form a sheathed ring spun yarn (SRS).

Example 5—Double Co-Extruded Tow (Non-Yarn)

In one preferred embodiment, the invention provides a co-extruded filament hybrid composite. In this example, 400d (denier) HBA/HNA (V1) and M-PAN (M) are melt co-extruded in a 90-10 ratio (V1:M) through fine diameter capillaries resulting in a first component strand (S1), and the first strand (S1) is then melt co-extruded with HBA/HNA (V2) in a 10:90 ratio (S1:V2), to form a double co-extruded hybrid composite filament (S2), which is then used to make a yarn and textile.

Example—Double Knit Interlock Textile

Referring again to FIG. 2, there is shown an example of a double knit interlock construction. Textile is constructed using a double-knit modified interlock construction. Double knitting is a form in which two fabrics are knitted simultaneously on one pair of needles. The fabrics may be inseparable, as in interlock knitted fabrics, or they can simply be two unconnected textiles. A double knit interlock will create a fabric that can be rib-like in appearance on one or both sides. Knitting creates a V-shape on one side of a fabric, with loops (pearls) on the back side. A double-knit will have two fabrics back-to-back with their inner loops adjacent one another and the outer V-pattern facing in opposite directions. These fabrics show good dimensional stability and are easy to cut and sew. They do not require any seam finishes, as the fabric does not unravel. They are firm, heavier, low stretch and more resilient, making them an ideal candidate when designing durable textiles. Interlocking is the process of taking connecting the back side loops together by alternatively jumping the yarn from one fabric to the other and back.

Optional Resins

In a preferred embodiment, the composite may be constructed using a combination of fiber reinforcement and a resin matrix. The resin system holds everything together, and transfers mechanical loads through the fibers to the rest of the structure. In addition to binding the composite structure together, it protects from impact, abrasion, corrosion, other environmental factors and rough handling. Resin systems come in a variety of chemical families, each designed and designated to serve industries providing certain advantages like economic, structural performance, resistance to various factors, legislation compliance, etc. Resins of the thermoset family are described below, and include polyester (orthophthalic and isophthalic), vinyl ester, epoxy, and phenolic.

Polyester resins—Unsaturated polyester resins are the simple, economical resins that are easy to prepare and show good performance. They are manufactured by the condensation polymerization of various diols (alcohols) and dibasic acids (e.g. maleic anhydride or fumaric acid) to give esters, a very viscous liquid that is then dissolved in styrene, a reactive monomer. Styrene lowers the viscosity to a level suitable for impregnation or lamination.

Orthophthalic resins—also referred to as ortho or General Purpose Polyester (GP) was the original polyester developed. It has a low cost and is used in applications where high mechanical properties, corrosion resistance, and thermal stability are not required.

Isophthalic resin—is an improved polyester. It has a slightly higher cost, improved strength, thermal stability (55° C.) and mild resistance to corrosion conditions. It has improved resistance to water permeation and improved chemical resistance.

Vinyl ester—another improved polyester, is bisphenol chlorinated, or a combination of polyester and epoxy. Its curing, handling and processing characteristics are those of polyester, and it exhibits higher test results in corrosion temperature resistance and strength. Modifications of the molecule can provide tailored properties.

Phenolic resin—is a reaction of phenol and formaldehyde. It can be cured via heat and pressure, without the use of catalysts or curing agents. Cured phenolic resins are fire resistant without the use of mineral fillers or fire retardant additives. Phenolic composites have excellent high-temperature properties. Phenolics are also unique in their chemical resistance.

Epoxy resins—are a broad family of materials. The most common ones are prepared from the reaction of bis-phenol A and epichlorohydrin and contain a reactive functional group in their molecular structure. Epoxy resin systems show extremely high three dimensional crosslink density which results to the best mechanical performance characteristics of all the resins. The most demanding strength/weight applications use epoxy almost exclusively. It has excellent strength and hardness, very good chemical heat and electrical resistance.

Gel coats—are prepared from a base resin and additives. The base resin can be polyester, vinyl ester, phenolic or epoxy. Additives are thixotropic agents, fillers, pigments and other. The gel coat, as the name implies, has a gel texture. This makes the gel coat capable to "stay" on vertical surfaces of molds without draping. It is placed first in the mold, so it becomes the outer surface of the construction.

Textiles, Fabric

The instant invention relates to multifunctional protective textiles (syn. fabrics) for protective garments and accessories made from high strength fibers and materials, as well as methods for making such multifunctional protective fabrics. In particular, the fabrics may be formed of high strength fibers that can be incorporated with other materials to produce comfortable garments and accessories that are resistant to abrasion, penetration, laceration, impact and are thermal and flame resistant.

Textile constructed using a double-knit modified interlock construction. Double knitting is a process by which two strands of yarn of the same or different varieties are knitted simultaneously on one pair of needles. The fabrics may be inseparable, as in interlock knitted fabrics, or they can simply be two unconnected textiles. A double knit interlock will create a fabric that has a tight ribbed appearance on both sides. These fabrics show good dimensional stability and are easy to cut and sew. They do not require any seam finishes as the fabric does not ravel. They are firm, stout, have low stretch and remain very resilient, making them an ideal candidate when designing durable textiles.

Textile Products

Textile applications include those within the field of the DoD, industrial safety, public safety, medical and action sports markets. Products include—high wear areas in apparel, bags (particularly dry bags), inflatable boats, air bags, footwear (penetration resistant insoles for boots, booties, flip flops or for high abrasion areas on exterior), gloves, dive gear, etc. The invention also contemplates that a wide variety of garments and accessories may be manufactured from the trauma-resistant fabric, including but not limited to, wetsuits, drysuits, uniforms, vests, flight suits, pullovers, rash guards, jackets, coveralls, gear bags, pouches, pockets, harnesses, webgear, hats, helmets, headgear, shoes, skate shoes, insoles, socks, booties, cuffs, armbands, gloves, tents, armor, carriers, belts, bags, covers, rope and other items.

Without limiting the invention, the yarn may in some embodiments contemplate the use of additional fibers. Fibers contemplated herein include additional filaments being selected from the group consisting of: modified polyacrylonitrile, polyacrylonitrile, rayon, nylon, aramid, olefins, carbon, glass, and polyethylene including ultra high molecular weight polyethylene (UHMWPE).

Without limiting the invention, the yarn may in some embodiments contemplate the use of additional embedded materials or coatings. Embedded materials and coatings contemplated herein include anti-bacterial coatings, silver coating, silver particles, silver nano particles, copper coating, copper particles, copper nano particles, as well as salts, conjugates, and combinations thereof.

In another embodiment, the invention contemplates the yarns may include, or be used in combination with, spun yarns, twisted yarns, plaited (braided) yarns, chopped yarns, filament yarns, jet blown yarns, core-wrapped yarns, and combinations thereof.

Weave patterns are also contemplated as within the scope of the inventive fabrics. Non-limiting preferred weave patterns include plain weave (alternating under/over of two perpendicular textile directions), plain dutch, reverse plain dutch, a 2×2 or 4×4 twill, twilled dutch, reverse twilled dutch, mesh, 3D-mesh, solid mesh, roll calendared, a unidirectional weave, a satin (periodic, e.g. 1-4, 1-5, or 1-8 under/over of perpendicular strands), crowfoot satin, herringbone, basket, sateen, diamond, percale, and honeycomb.

Figure 12:
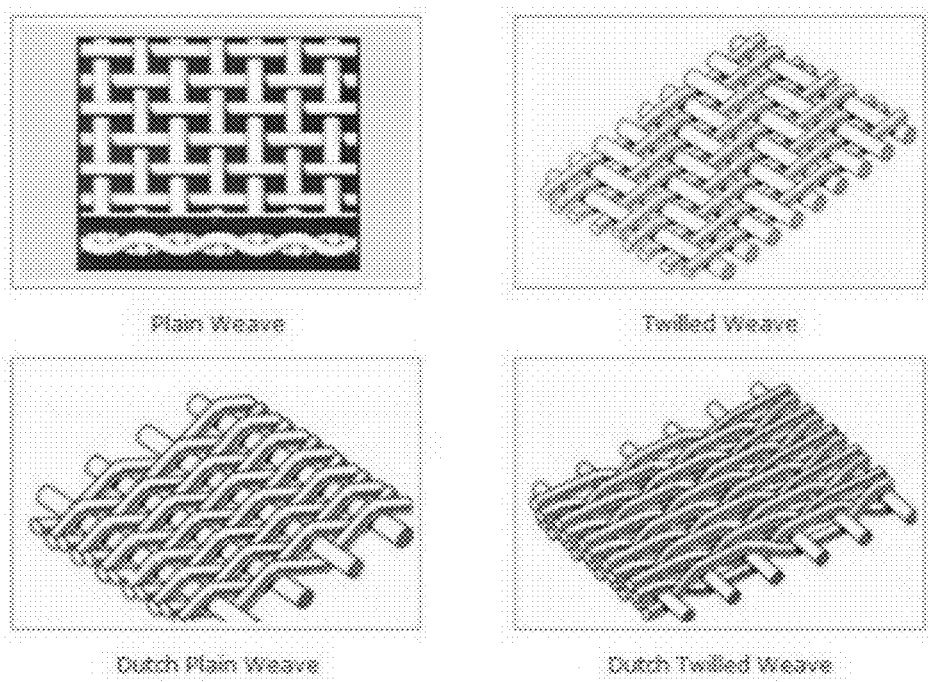
FIG. 12 is a drawing of four different types of weave patterns.

Referring now to FIG. 12, a variety of weave patterns are contemplated as within the scope of the invention, including without limitation, the plain weave, twilled weave, dutch plain weave, and dutch twilled weave, shown.

Figure 13:
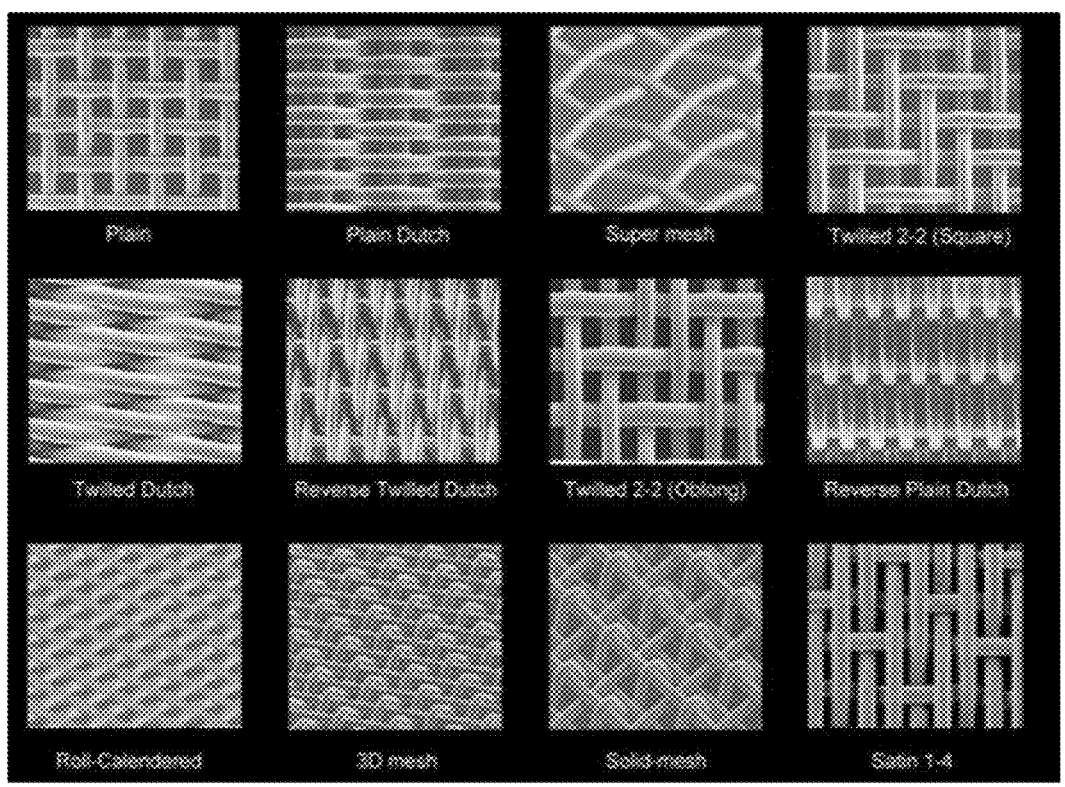
FIG. 13 is a photomicrograph of 12 different types of weave patterns.

Referring to to FIG. 13, FIG. 13 is a photomicrograph of 12 different types of weave patterns. For polymer fibers, various weave patterns are contemplated as within the scope of the invention, including without limitation, the plain weave, the plain dutch, the super mesh, the twilled 2-2 square, the twilled dutch, the reverse twilled dutch, the twilled 2-2 oblong, the reverse plain dutch, the roll calendared, the 3D mesh, the solid mesh, and the satin 1-4, shown.

Referring now to FIG. 18, there is a non-limiting example of a process for making the yarn and textiles described herein. Specifically, FIG. 18 shows a method of manufacturing a yarn for a textile, comprising the steps: (i) preparing a first liquid crystal polymer filament that comprises melt spun fibers of a polycondensate of 4-hydroxybenzoic acid (HBA) and 6-hydroxynaphthalene-2-carboxylic acid (HNA) monomers (HBA/HNA), wherein the first liquid crystal polymer filament comprises a denier selected from the group consisting of 200d, 400d, 750d, 1000d, 1420d, 1500d, and 2250d; (ii) preparing a ring spun yarn, wherein the ring spun yarn is made from a second liquid crystal polymer filament and a spun modified polyacrylonitrile (M-PAN), wherein the second liquid crystal polymer filament comprises melt spun fibers of a polycondensate of 4-hydroxybenzoic acid (HBA) and 6-hydroxynaphthalene-2-carboxylic acid (HNA) monomers (HBA/HNA), wherein the second liquid crystal polymer filament comprises a denier selected from the group consisting of 200d, 400d, 750d, 1000d, 1420d, 1500d, and 2250d; (iii) forming a sheath-core structure by core-spinning a combination of the first liquid crystal polymer filament and the ring spun yarn, wherein the core is selected from the group consisting of the ring spun yarn and the first liquid crystal polymer filament, and wherein the sheath is selected from the group consisting of the ring spun yarn and the first liquid crystal polymer filament, and wherein the core and the sheath are different; and (iv) spinning a composite yarn from the core-spun combination of the first liquid crystal polymer filament and the ring spun yarn. FIG. 18 also shows an optional preferred step of preparing a textile from the composite yarn.

The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

What is claimed is:

1. A multilayer knitted textile, comprising:
   (i) at least one flame resistant knitted outer layer made of a first yarn containing modacrylic, FR rayon, Opan, or aramid fibers; and,
   (ii) at least one penetration resistant knitted inner layer made of a second yarn made from 50-90% HBA/HNA filaments.

2. The multilayer knitted textile of claim 1, wherein the at least one flame resistant knitted outer layer is attached to the at least one penetration resistant knitted layer using a knitting technique or is sewn.

3. The multilayer knitted textile of claim 1, wherein the at least one flame resistant knitted outer layer is interlock knitted to the at least one penetration resistant knitted layer.

4. The multilayer knitted textile of claim 1, wherein the at least one flame resistant knitted outer layer is plaited with the at least one penetration resistant knitted layer as an overbraid.

5. An article comprising the multilayer knitted textile of claim 1, wherein the article is selected from the group of products consisting of apparel, bags, dry bags, inflatable boats, air bags, footwear, insoles for boots, booties, flip flops, gloves, dive gear, wetsuits, drysuits, uniforms, vests, flight suits, pullovers, rash guards, jackets, coveralls, shirts, trousers, gear bags, pouches, pockets, harnesses, web-gear, hats, helmets, headgear, shoes, skate shoes, insoles, socks, cuffs, armbands, gloves, tents, armor, carriers, belts, bags, covers, furnishings, drapery, outdoor fabric, and rope.

6. A process for manufacturing a multilayer knitted textile, comprising the steps:
(i) providing a first yarn containing modacrylic, FR rayon, Opan, or aramid fibers;
(ii) knitting the first yarn into a fabric outer layer;
(iii) providing a second yarn made from 50-90% HBA/HNA filaments;
(iv) knitting the second yarn into a fabric inner layer; and
(v) assembling the fabric outer layer and the fabric inner layer into a multilayer knitted textile.

7. A composite yarn construction, comprising: a yarn made from
liquid crystal polymer filaments and
a ring spun yarn,
wherein the (b) ring spun yarn is made from (b1) liquid crystal polymer filaments and (b2) spun modified acrylonitrile.

8. The composite yarn of claim 7, wherein (a) liquid crystal polymer filaments are melt spun aromatic polyester filaments.

9. The composite yarn of claim 8, wherein the (a) liquid crystal polymer filaments are melt spun fibers of a polycondensate of 4-hydroxybenzoic acid (HBA) and 6-hydroxynaphthalene-2-carboxylic acid (HNA) monomers (HBA/HNA).

10. The composite yarn of claim 7, wherein the (a) liquid crystal polymer filaments are melt spun fibers of a polycondensate of 4-hydroxybenzoic acid (HBA) and 6-hydroxynaphthalene-2-carboxylic acid (HNA) monomers (HBA/HNA) and wherein the liquid crystal polymer filaments comprise a denier selected from the group consisting of 200d, 400d, 750d, 1000d, 1420d, 1500d, and 2250d.

11. The composite yarn of claim 7, wherein the (b1) liquid crystal polymer filaments of (b) the ring spun yarn are melt spun aromatic polyester filaments.

12. The composite yarn of claim 7, wherein the (b1) liquid crystal polymer filaments of (b) the ring spun yarn are melt spun fibers of a polycondensate of 4-hydroxybenzoic acid (HBA) and 6-hydroxynaphthalene-2-carboxylic acid (HNA) monomers (HBA/HNA).

13. The composite yarn of claim 7, wherein the (b1) liquid crystal polymer filaments of (b) the ring spun yarn are melt spun fibers of a polycondensate of 4-hydroxybenzoic acid (HBA) and 6-hydroxynaphthalene-2-carboxylic acid (HNA) monomers (HBA/HNA), and wherein the liquid crystal polymer filaments comprise a denier selected from the group consisting of 200d, 400d, 750d, 1000d, 1420d, 1500d, and 2250d.

14. The composite yarn of claim 7, wherein the (b2) spun M-PAN co-polymer has 35-50% acrylonitrile or 50-85% acrylonitrile.

15. The composite yarn of claim 7, wherein the percentage of (a) liquid crystal polymer filaments ranges from 70-99% and (b) a ring spun yarn ranges from 1-30% by weight.

16. The composite yarn of claim 7, wherein the percentage of (a) liquid crystal polymer filaments ranges from 85-95% and (b) a ring spun yarn ranges from 5-15% by weight.

17. The composite yarn of claim 7, wherein the percentage of (a) liquid crystal polymer filaments is 90% and (b) a ring spun yarn is 10% by weight.

18. The composite yarn of claim 7, wherein the percentage in the (b) ring spun yarn of (b1) liquid crystal polymer filaments ranges from 70-99% and (b) M-PAN ranges from 1-30% by weight.

19. The composite yarn of claim 7, wherein the percentage in the (b) ring spun yarn of (b1) liquid crystal polymer filaments ranges from 85-95% and (b) M-PAN ranges from 5-15% by weight.

20. The composite yarn of claim 7, wherein the percentage in the (b) ring spun yarn of (b1) liquid crystal polymer filaments 90% and (b) M-PAN is 10% by weight.

21. A method of manufacturing a yarn for a textile, comprising the steps:
preparing a first liquid crystal polymer filament that comprises melt spun fibers of a polycondensate of 4-hydroxybenzoic acid (HBA) and 6-hydroxynaphthalene-2-carboxylic acid (HNA) monomers (HBA/HNA), wherein the first liquid crystal polymer filament comprises a denier selected from the group consisting of 200d, 400d, 750d, 1000d, 1420d, 1500d, and 2250d;
preparing a ring spun yarn, wherein the ring spun yarn is made from a second liquid crystal polymer filament and a spun modified acrylonitrile, wherein the second liquid crystal polymer filament comprises melt spun fibers of a polycondensate of 4-hydroxybenzoic acid (HBA) and 6-hydroxynaphthalene-2-carboxylic acid (HNA) monomers (HBA/HNA), wherein the second liquid crystal polymer filament comprises a denier selected from the group consisting of 200d, 400d, 750d, 1000d, 1420d, 1500d, and 2250d;
forming a sheath-core structure by core-spinning a combination of the first liquid crystal polymer filament and the ring spun yarn, wherein the core is selected from the group consisting of the ring spun yarn and the first liquid crystal polymer filament, and wherein the sheath is selected from the group consisting of the ring spun yarn and the first liquid crystal polymer filament, and wherein the core and the sheath are different; and
spinning a composite yarn from the core-spun combination of the first liquid crystal polymer filament and a ring spun yarn of modified acrylonitrile.

* * * * *